United States Patent
Yokote

(10) Patent No.: US 7,887,198 B2
(45) Date of Patent: Feb. 15, 2011

(54) OPTICAL DEVICE AND PROJECTION TYPE VIDEO DISPLAY INCLUDING OPTICAL DEVICE

(75) Inventor: Yoshihiro Yokote, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 907 days.

(21) Appl. No.: 11/475,918

(22) Filed: Jun. 28, 2006

(65) Prior Publication Data

US 2007/0001104 A1    Jan. 4, 2007

(30) Foreign Application Priority Data

Jun. 29, 2005  (JP) .......................... P2005-190314
Jun. 2, 2006   (JP) .......................... P2006-154565

(51) Int. Cl.
G03B 21/14   (2006.01)
F21V 7/04    (2006.01)

(52) U.S. Cl. .................... 353/97; 362/551; 362/552

(58) Field of Classification Search ............... 353/81, 353/97; 359/598; 362/261, 262, 263, 264, 362/299–304, 551, 552, 555, 583, 561, 560, 362/511; 348/835; 385/133, 901, 146
See application file for complete search history.

(56) References Cited

U.S. PATENT DOCUMENTS

| | | | | |
|---|---|---|---|---|
| 3,922,085 A * | 11/1975 | Sheets | .................. | 355/71 |
| 4,298,275 A * | 11/1981 | Critchlow et al. | ............. | 322/71 |
| 5,742,438 A * | 4/1998 | Conner et al. | ............... | 359/743 |
| 6,854,865 B2 * | 2/2005 | Probst et al. | ................. | 362/341 |
| 6,894,839 B2 * | 5/2005 | Sugiyama et al. | ........... | 359/618 |
| 7,172,319 B2 * | 2/2007 | Holder et al. | ............... | 362/341 |
| 7,195,386 B2 * | 3/2007 | Imade | ........................ | 362/551 |
| 7,246,923 B2 * | 7/2007 | Conner | ....................... | 362/309 |
| 7,314,279 B2 * | 1/2008 | Teijido et al. | ................. | 353/31 |
| 7,319,285 B2 * | 1/2008 | Hanano | ...................... | 313/111 |
| 7,327,521 B2 * | 2/2008 | Tani | ............................ | 359/629 |
| 7,445,340 B2 * | 11/2008 | Conner et al. | ................. | 353/20 |
| 2001/0019396 A1 * | 9/2001 | Osaka | ......................... | 353/31 |
| 2002/0030793 A1 * | 3/2002 | Mihara | ........................ | 353/31 |
| 2002/0163730 A1 * | 11/2002 | Sugiyama et al. | ........... | 359/618 |
| 2004/0179349 A1 * | 9/2004 | Buelow et al. | ................ | 362/31 |
| 2005/0012903 A1 * | 1/2005 | Drazic et al. | .................. | 353/30 |
| 2005/0174771 A1 * | 8/2005 | Conner | ....................... | 362/244 |
| 2005/0185140 A1 * | 8/2005 | Matsubara et al. | ........... | 353/20 |
| 2005/0213344 A1 * | 9/2005 | Inamoto | ..................... | 362/611 |
| 2006/0044523 A1 * | 3/2006 | Teijido et al. | ................. | 353/53 |
| 2006/0109390 A1 * | 5/2006 | Liang | ............................ | 349/5 |

(Continued)

FOREIGN PATENT DOCUMENTS

JP    2000-147377    5/2000

Primary Examiner—Georgia Y Epps
Assistant Examiner—Danell L Owens
(74) Attorney, Agent, or Firm—NDQ&M Watchstone LLP

(57) ABSTRACT

An optical device includes a light source, a light valve and a projection lens configured to enlarge an image to be displayed on the light valve. The light valve is disposed in the vicinity of an object plane of the projection lens. The light source illuminates a peripheral portion more brightly than an optical axis portion, in a plane parallel to the object plane located in the vicinity of the object plane of the projection lens. The optical axis portion is a portion where an optical axis passes through and the peripheral portion is a portion located in the periphery of an optical axis portion.

5 Claims, 14 Drawing Sheets

U.S. PATENT DOCUMENTS

2006/0164857 A1*  7/2006  Morejon et al. ............. 362/555
2007/0171384 A1*  7/2007  Godo ......................... 353/81
2008/0117387 A1*  5/2008  Hamano et al. ............... 353/85
2008/0285139 A1*  11/2008  Chen .......................... 359/630

* cited by examiner

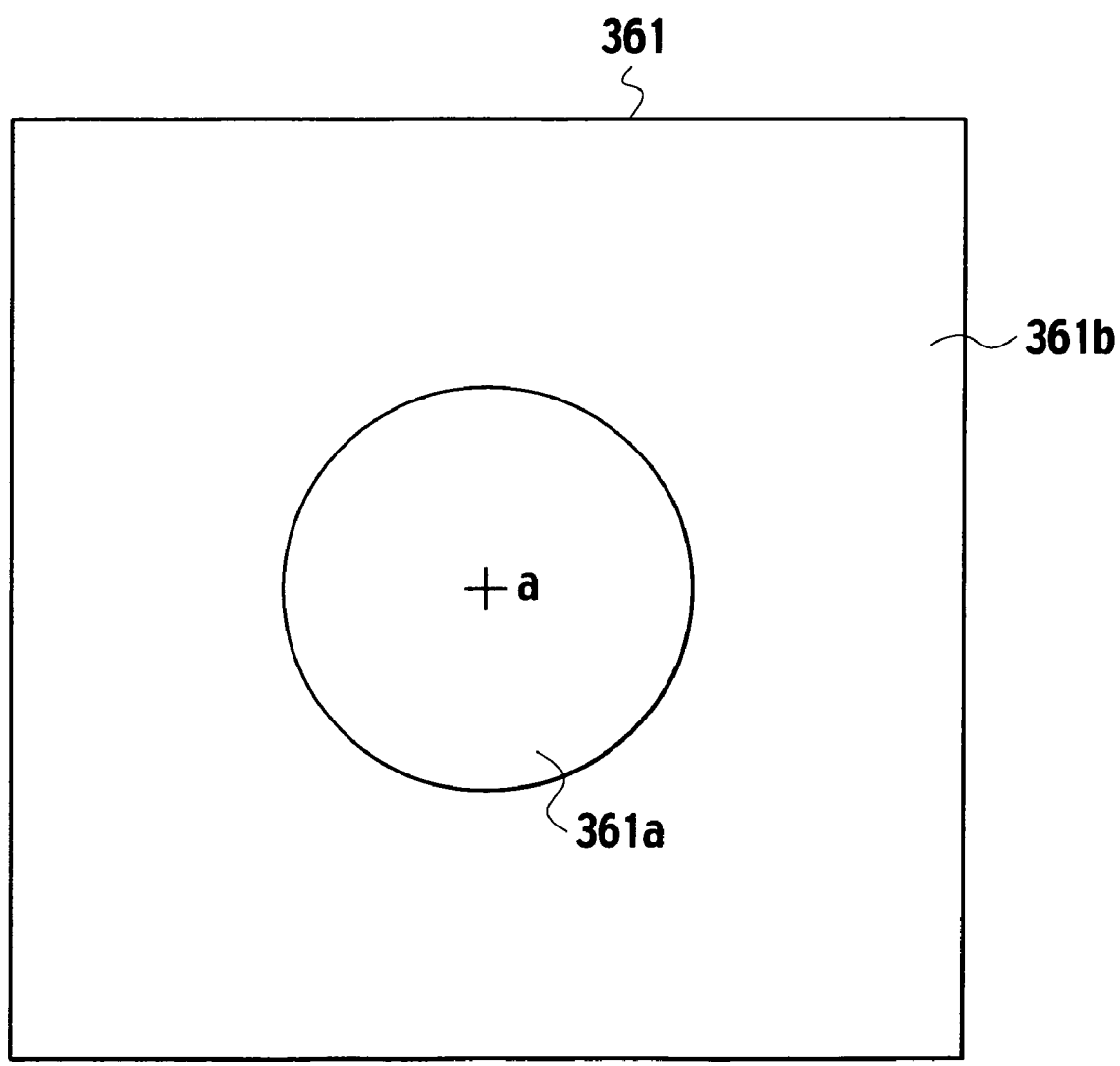

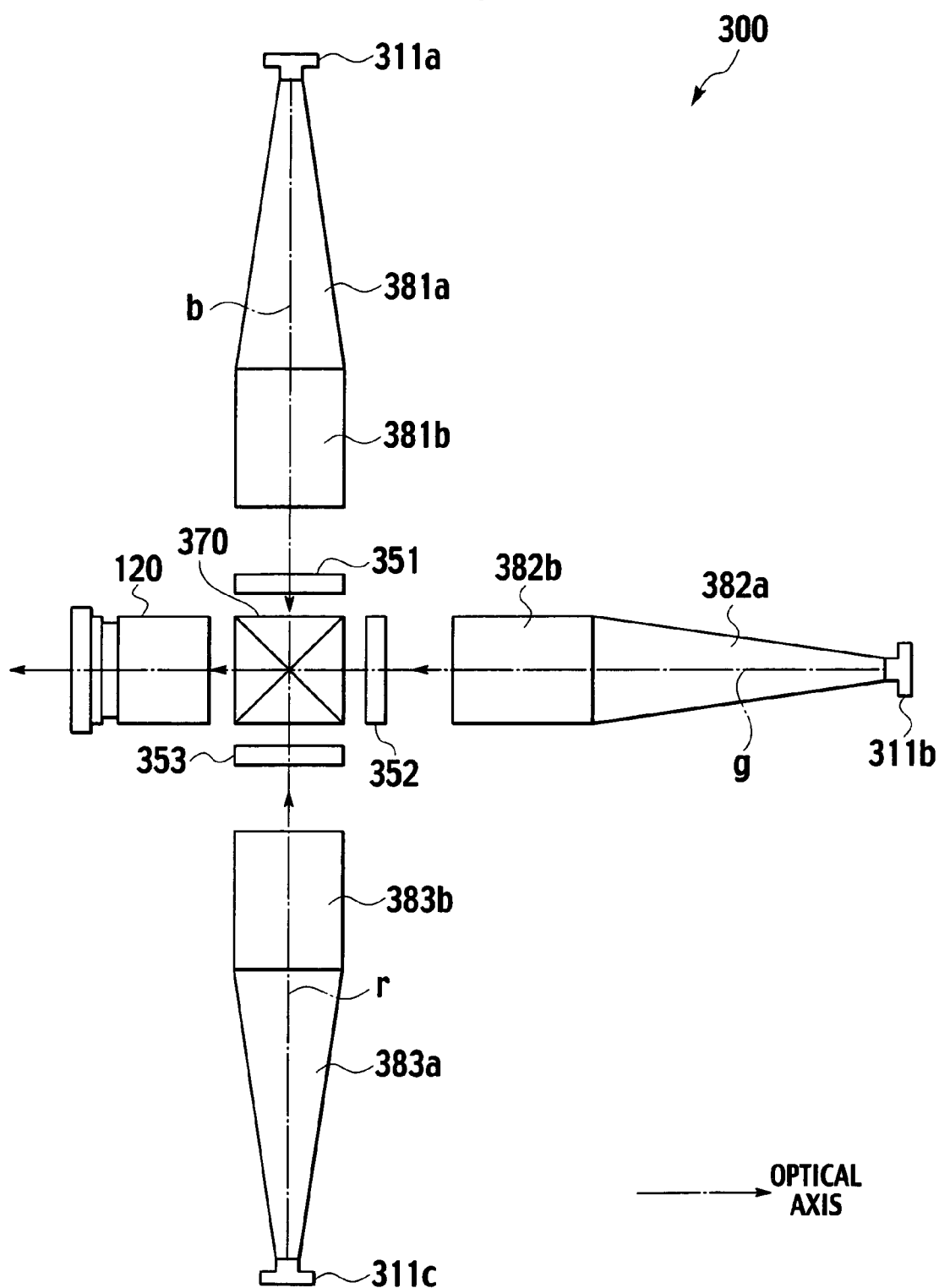

☐ ···ONLY STRAIGHT LIGHT BEAM

▨ , ▩ ···STRAIGHT LIGHT BEAM + REFLECTED LIGHT BEAM

OPTICAL DEVICE AND PROJECTION TYPE VIDEO DISPLAY INCLUDING OPTICAL DEVICE

CROSS REFERENCE TO RELATED APPLICATIONS

This application is based upon and claims the benefit of priority from prior Japanese Patent Application No. 2005-190314, filed on Jun. 29, 2005 and prior Japanese Patent Application No. 2006-154565, filed on Jun. 2, 2006; the entire contents of which are incorporated herein by reference.

BACKGROUND OF THE INVENTION

1. Field of the Invention

The present invention relates to an optical device including a light source and a light valve (a liquid crystal panel) having a planar shape which is perpendicular to a direction of an optical axis of light emitted from the light source, and the present invention relates to a projection type video display including this optical device.

2. Description of the Related Art

Conventionally, a projection type video display (such as a projector or a projection television set) has been generally known well, the apparatus includes a projection lens for enlarging an image displayed on a light valve such as a liquid crystal panel or a digital micromirror device (DMD) and for projecting the image onto a screen or the like.

In general, efficiency for light utilization of a projection lens is worse in a peripheral portion than in a portion where an optical axis passes through the projection lens (the latter portion will be hereinafter referred to as an optical axis portion). For this reason, there has been a problem that a peripheral portion of an image projected on a screen (a projected image) becomes darker (what we call "the light amount deterioration in peripheral portion"). Accordingly, there have been various methods proposed for equalizing illuminance distribution of an image projected on a screen (a projected image) or the like.

As an example of these methods, there can be a method cited for equalizing illuminance distribution of an image projected on a screen by combining numerous convex lenses and concave lenses to configure a group of projection lenses, thereby enlarging an image projected on a light valve (see Claim 1, Paragraph [0017], FIG. 2, etc. of Japanese Unexamined Patent Publication No. 2000-147377, for example).

Meanwhile, in order to avoid using a peripheral portion of a projection lens having poor efficiency for light utilization, a method of expanding an image circle by use of a projection lens of a large diameter is also conceivable.

SUMMARY OF THE INVENTION

With respect to first aspect of the present invention, an optical device includes a light source, light valves, and a projection lens for enlarging an image to be displayed on the light valves. In the optical device, the light valve is disposed in the vicinity of an object plane of the projection lens, and the light source illuminates a peripheral portion more brightly than an optical axis portion, in a plane parallel to the object plane located in the vicinity of the object plane of the projection lens. The optical axis portion is a portion where an optical axis passes through and the peripheral portion is a portion located in the periphery of the optical axis portion.

According to this aspect, the light source illuminates the peripheral portion more brightly than the optical axis portion in the plane parallel to the object plane of the projection lens. Therefore, it is possible to equalize illuminance distribution of an image projected on a screen (a projected image) or the like without using a projection lens of a large diameter. Moreover, it is possible to easily equalize the illuminance distribution of the image projected on the screen or the like without complicating a configuration of a group of projection lenses.

With respect to second aspect of the present invention, the optical device according to the first aspect of the present invention further includes a light transmitting filter disposed on any of an incident side where light emitted by the light source enters the light valve and an outgoing side where the light emitted by the light source goes out of the light valve. Here, the light transmitting filter includes a filter optical axis portion which is a portion where the optical axis passes through, and a filter peripheral portion which is a portion located in the periphery of the filter optical axis portion. Moreover, optical transmittance of the filter peripheral portion is higher than optical transmittance of the filter optical axis portion.

With respect to third aspect of the present invention, the optical device according to the first aspect of the present invention further includes a tapered rod disposed on a side of the light valve from the light source and having a shape extending along the optical axis, and a light guiding member disposed on a side of the light valve from the tapered rod and having a shape extending along the optical axis. Here, the tapered rod have a shape spreading increasingly from the light source toward the light guiding members, and the light guiding member reflects the light passing through the tapered rods by use of side surfaces of the light guiding member and thereby guides the light to the light valve.

With respect to a fourth aspect of the present invention, in the optical device of the third aspect of the present invention, the light guiding member is made of a transparent medium.

With respect to a fifth aspect of the present invention, in the optical device of the third aspect of the present invention, the light guiding members have a hollow shape including inner walls of the light guiding members configured of mirrors.

With respect to a sixth aspect of the present invention, in the optical device of the third aspect of the present invention, a length of the light guiding members is shorter than a length of the tapered rods.

With respect to a seventh aspect of the present invention, a projection type video display includes the optical device according to any one of the first to sixth aspects of the present invention.

BRIEF DESCRIPTION OF THE DRAWINGS

FIG. 3 is a view showing a light transmitting filter according to the first embodiment of the present invention.

FIG. 4 is a view showing an optical device according to a second embodiment of the present invention.

DETAILED DESCRIPTION OF THE PREFERRED EMBODIMENTS

First Embodiment (Configuration of Projection Type Video Display)

Figure 1:
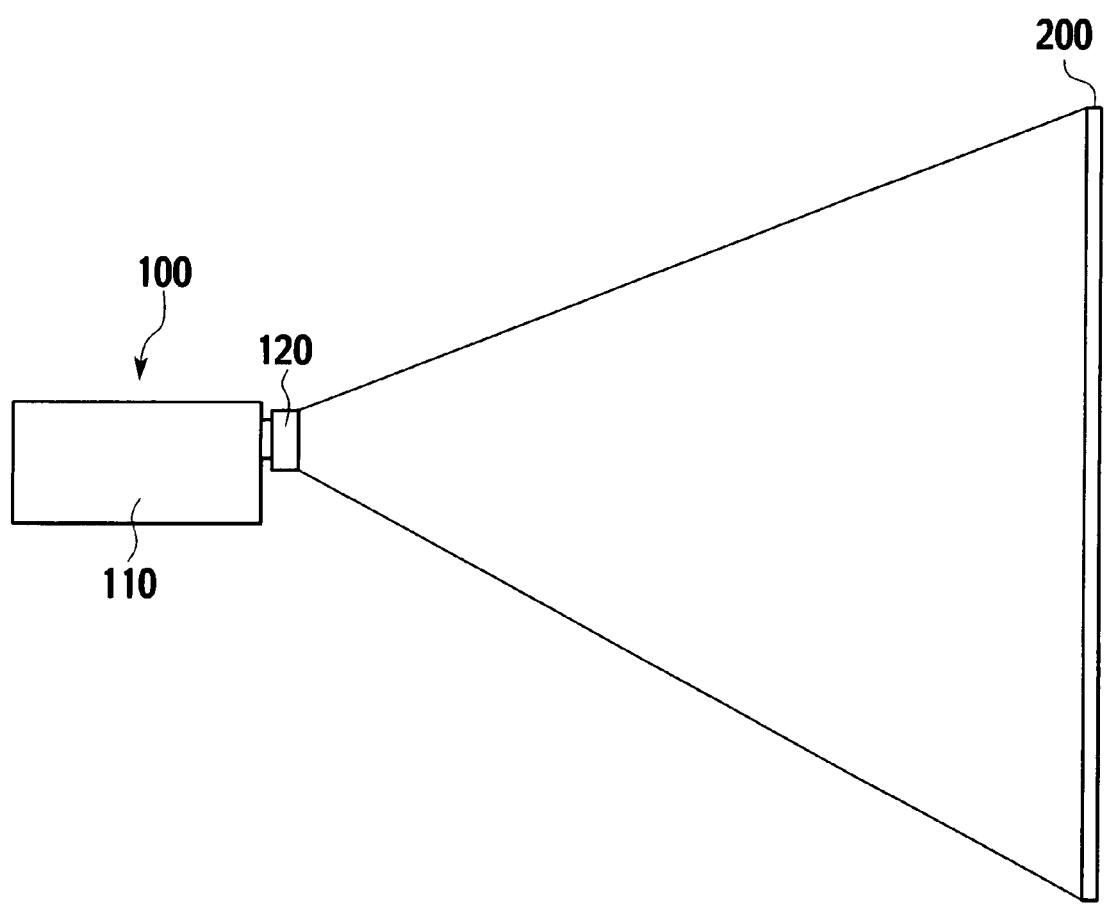
FIG. 1 is a view showing a projection type video display according to a first embodiment of the present invention.

Hereinafter, a configuration of a projection type video display according to a first embodiment of the present invention will be described with reference to the accompanying drawing. FIG. 1 is a view showing a projection type video display 100 according to the first embodiment of the present invention.

As shown in FIG. 1, the projection type video display 100 is a projector or the like for displaying an image on a screen 200. Specifically, the projection type video display 100 includes: a main unit 110 for housing a light source, such as a high pressure mercury lamp or a light emitting diode (LED), and a light valve such as a liquid crystal panel; and a projection lens 120 configured to enlarge an image displayed on the light valve.

Incidentally, the first embodiment will be described on the assumption that the projection type video display 100 is a projector. However, the present invention is not limited thereto and a projection television set is also applicable.

(Configuration of Optical Device)

Figure 2:
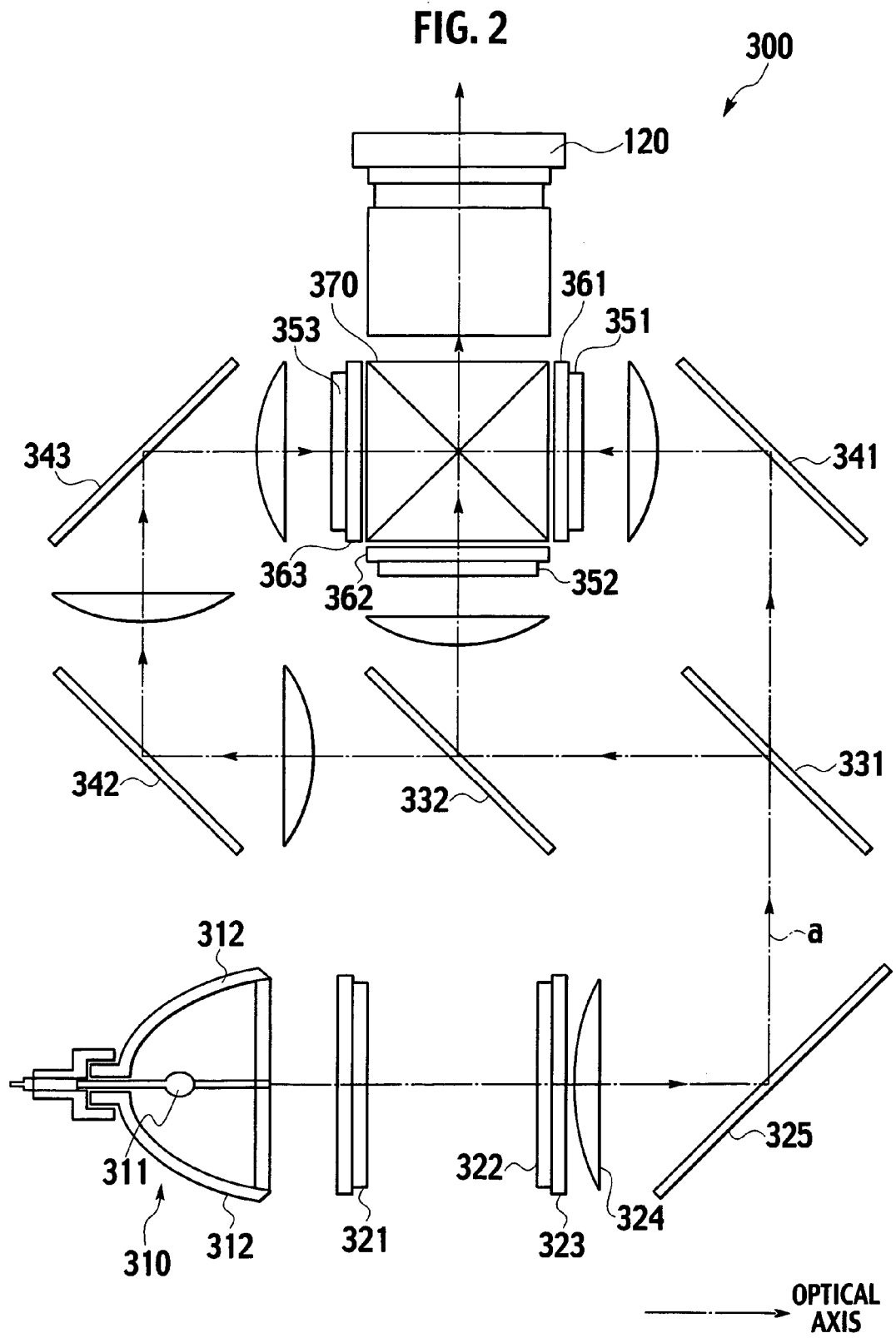
FIG. 2 is a view showing an optical device according to the first embodiment of the present invention.

Hereinafter, a configuration of an optical device according to the first embodiment of the present invention will be described with reference to the accompanying drawing. FIG. 2 is a view showing an optical device 300 according to the first embodiment of the present invention.

As shown in FIG. 2, the optical device 300 irradiates light emitted by a light source 310 onto liquid crystal panels 351 to 353, and generates an image by combining the light passing through the liquid crystal panels 351 to 353 by use of a color combiner 370. Moreover, the optical device 300 enlarges the generated image by use of the projection lens 120 and displays the image on the screen 200.

Specifically, the light source 310 includes a high pressure mercury lamp 311 which emits the light, and a reflector 312 which reflects the light emitted by the high pressure mercury lamp 311.

A fly-eye lens 321, a fly-eye lens 322, and a condenser lens 324 uniform the light emitted by the high pressure mercury lamp 311, and a PS converter 323 aligns a polarizing direction of the outgoing light. Meanwhile, a mirror 325 reflects the light which passes through the condenser lens 324.

A dichroic mirror 331 allows the light having a wavelength corresponding to blue to pass through and reflects the light having wavelengths corresponding to green and red. Similarly, a dichroic mirror 332 allows the light having the wavelength corresponding to red to pass through and reflects the light having the wavelength corresponding to green.

A mirror 341 reflects the light that passes through the dichroic mirror 331 (the light having the wavelength corresponding to blue). Similarly, a mirror 342 and a mirror 343 reflect the light that passes through the dichroic mirror 332 (the light having the wavelength corresponding to red).

A liquid crystal panel 351 has a planar shape which is perpendicular to a direction of an optical axis a of the light emitted by the light source 310. The liquid crystal panel 351 displays an image corresponding to blue while allowing the light having the wavelength corresponding to blue to pass through. Similarly, a liquid crystal panel 352 has a planar shape which is perpendicular to the direction of the optical axis a of the light emitted by the light source 310. The liquid crystal panel 352 displays an image corresponding to green while allowing the light having the wavelength corresponding to green to pass through. Meanwhile, a liquid crystal panel 353 has a planar shape which is perpendicular to the direction of the optical axis a of the light emitted by the light source 310. The liquid crystal panel 353 displays an image corresponding to red while allowing the light having the wavelength corresponding to red to pass through. Here, the liquid crystal panels 351 to 353 are disposed at an object plane of the projection lens 120.

A light transmitting filter 361 is disposed on an outgoing side where the light emitted by the light source 310 goes out from the liquid crystal panel 351 (i.e., to the side of the liquid crystal panel 351 facing the color combiner 370). Similarly, a light transmitting filter 362 is disposed on an outgoing side where the light emitted by the light source 310 goes out of the liquid crystal panel 352 (i.e., to the side of the liquid crystal panel 352 facing the color combiner 370), and a light transmitting filter 363 is disposed on an outgoing side where the light emitted by the light source 310 goes out of the liquid crystal panel 353 (i.e., to the side of the liquid crystal panel 353 facing the color combiner 370). Note that details of the light transmitting filters 361 to 363 will be described later (see FIG. 3).

The color combiner 370 combines the light passing through the liquid crystal panels 351 to 353. Specifically, the color combiner 370 combines the images in blue, green, and red displayed on the respective liquid crystal panels and generates one image. Meanwhile, the projection lens 120 enlarges and projects the image generated by the color combiner 370.

Note that, in the first embodiment, the light transmitting filters 361 to 363 are disposed on the outgoing sides where the light emitted by the light source 310 goes out of the liquid crystal panels 351 to 353. However, the present invention is not limited to this configuration. The light transmitting filters 361 to 363 may be disposed on incident sides where the light emitted by the light source 310 enters the liquid crystal panels 351 to 353 (i.e., to the sides of the liquid crystal panels 351 to 353 facing the light source 310).

(Configuration of Light Transmitting Filter)

Hereinafter, a configuration of the light transmitting filter according to the first embodiment of the present invention will be described with reference to the accompanying drawing. FIG. 3 is a view showing the light transmitting filters 361 to 363 according to the first embodiment of the present invention. Note that, since the light transmitting filters 361 to 363 have the same configuration, FIG. 3 describes the light emitting filter 361 as an example.

As shown in FIG. 3, the light transmitting filter 361 includes a filter optical axis portion 361a which is a portion where the optical axis passes through, and a filter peripheral portion 361b which is a portion located in the periphery of the filter optical axis portion 361a. Moreover, optical transmittance of the filter peripheral portion 361b is higher than optical transmittance of the filter optical axis portion 361a.

Here, the sizes of the filter optical axis portion 361a and the filter peripheral portion 361b are determined depending on efficiency for light utilization of the projection lens 120. Specifically, the filter optical axis portion 361a has the size corresponding to a portion within a range of an image circle where the efficiency for light utilization is high, while the filter peripheral portion 361b has the size corresponding to a portion within the range of the image circle where the efficiency for light utilization is low.

Note that, the light transmitting filter 361 is preferably configured to have optical transmittance which is increased stepwise in radial directions from the point where the optical axis a passes according to deterioration in the efficiency for light utilization of the projection lens 120.

In this way, the light emitted by the light source 310 passes through the light transmitting filter 361 and thereby illuminates the peripheral portion located in the periphery of the optical axis portion more brightly than the optical axis portion where the optical axis a passes through, in a plane parallel to the object plane of the projection lens 120 located in the vicinity of the object plane. Note that, in the first embodiment, "the vicinity of the object plane" is defined as including the object plane.

Note that, in the first embodiment, the "plane parallel to the object plane of the projection lens 120 located in the vicinity of the object plane" means the plane which is located in the outgoing side where the light emitted by the light source 310 goes out of the light transmitting filter 361 and which is parallel to the object plane.

(Operations and Effects)

According to the optical device (or a projection type video display including the same) of the first embodiment of the present invention, the light transmitting filters 361 to 363, in which the optical transmittance of the filter peripheral portions 361b to 363b is higher than the optical transmittance of the filter optical axis portions 361a to 363a, are disposed in the vicinities of the liquid crystal panels 351 to 353. Accordingly, the light source 310 can illuminate the peripheral portions more brightly than the optical axis portions where the optical axis passes through, in the plane parallel to the object plane of the projection lens 120 located in the vicinity of the object plane. That is, it is possible to equalize illuminance distribution of the image projected on the screen 200 (a projected image) easily without a projection lens of a large diameter, since the light transmitting filters 361 to 363 counterbalance the light amount deterioration in the peripheral portion of the projection lens 120. Moreover, it is possible to easily equalize the illuminance distribution of the image projected on the screen 200 without complicating the configuration of the projection lens 120.

Second Embodiment (Configuration of Optical Device)

Hereinafter, a configuration of an optical device according to a second embodiment of the present invention will be described with reference to the accompanying drawing. FIG. 4 is a view showing an optical device 300 according to the second embodiment of the present invention. In FIG. 4, the same constituents as those described in FIG. 2 are denoted by the same reference numerals, and differences from FIG. 2 will be mainly described below.

As shown in FIG. 4, the optical device 300 includes LEDs (Light Emitting Diodes) (a blue LED 311a, a green LED 311b, and a red LED 311c) configured to irradiate light onto respective liquid crystal panels, tapered rods (a tapered rod 381a, a tapered rod 382a, and a tapered rod 383a) each having a shape spreading increasingly from the LED toward a light guiding member, and light guiding members (a light guiding member 381b, a light guiding member 382b, and a light guiding member 383b) configured to guide the light from the LEDs to the liquid crystal panels.

Specifically, the tapered rod 381a is located in the side of the blue LED 311a facing the liquid crystal panel 351, and has a shape extending in a direction of an optical axis b. Similarly, the tapered rod 382a is located in the side of the green LED 311b facing the liquid crystal panel 352, and has a shape extending in a direction of an optical axis g, and the tapered rod 383a is located in the side of the red LED 311c facing the liquid crystal panel 353, and has a shape extending in a direction of an optical axis r.

The light guiding member 381b is located in the side of the tapered rod 381a facing the liquid crystal panel 351, and has a prismatic shape extending in the direction of the optical axis b. Similarly, the light guiding member 382b is located in the side of the tapered rod 382a facing the liquid crystal panel 352, and has a prismatic shape extending in the direction of the optical axis g, and the light guiding member 383b is located in the side of the tapered rod 383a facing the liquid crystal panel 353, and has a prismatic shape extending in the direction of the optical axis r.

(Configurations of Tapered Rod and Light Guiding Member)

Figure 5A:
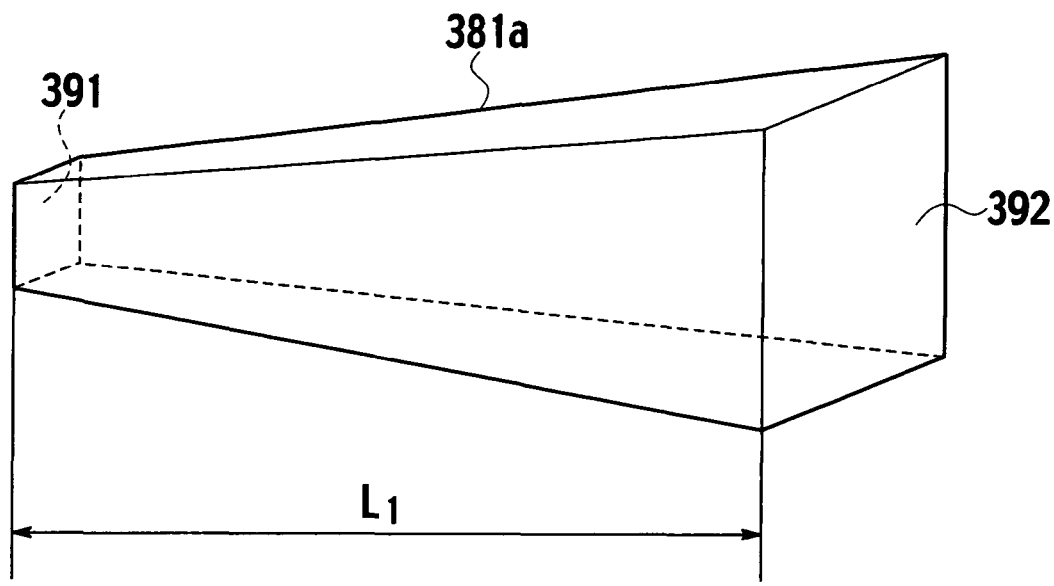
FIGS. 5A and 5B are views showing a tapered rod and a light guiding member according to the second embodiment of the present invention.
Figure 5B:
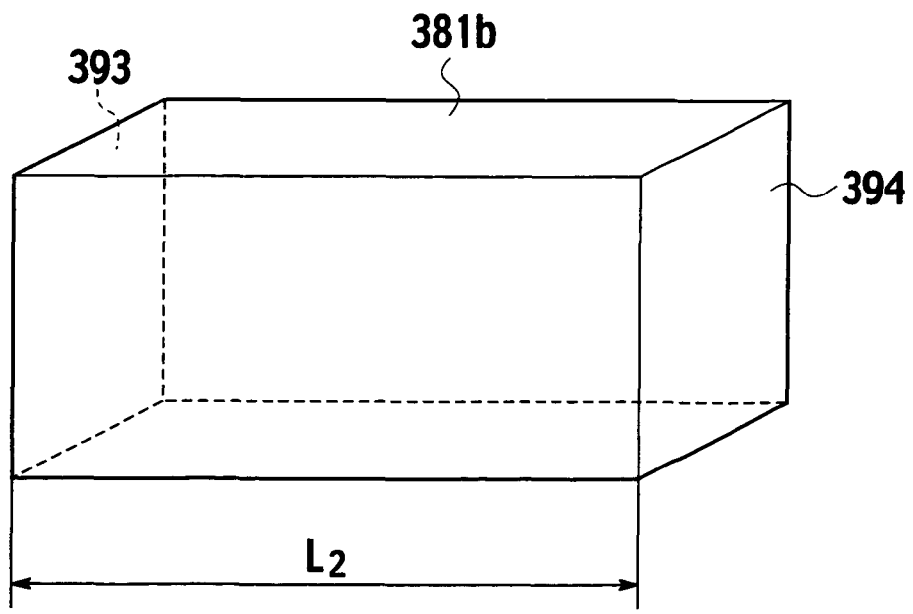

Hereinafter, configurations of the tapered rods and the light guiding members according to the second embodiment of the present invention will be described with reference to the accompanying drawings. FIG. 5A is a view showing the tapered rods 381a to 381c according to the second embodiment of the present invention, and FIG. 5B is a view showing the light guiding members 381b to 383b according to the second embodiment of the present invention. Note that, since the tapered rods 381a to 383a have the same configuration, the tapered rod 381a is described as an example in FIG. 5A. Similarly, since the light guiding members 381b to 383b has the same configuration, the light guiding member 381b is described as an example in FIG. 5B.

As shown in FIG. 5A, the tapered rod 381a has a prismatic and tapered shape spreading increasingly from the blue LED 311a toward the light guiding member 381b. Moreover, the tapered rod 381a has an incident surface 391 at the end facing the blue LED 311a, and has an outgoing surface 392 at the end facing the light guiding member 381b, whereby the light emitted by the blue LED 311a is guided from the incident surface 391 to the outgoing surface 392. Note that, as described above, the tapered rod has the increasingly spreading shape. Therefore, the area of the incident surface 391 is smaller than the area of the outgoing surface 392.

As shown in FIG. 5B, the light guiding member 381b is made of a transparent medium such as glass and has the prismatic shape. Moreover, the light guiding member 381b has an incident surface 393 at the end facing the tapered rod 381a, and has an outgoing surface 394 at the end facing the liquid crystal panel 351. In addition, the light guiding member 381b reflects the light emitted by the blue LED 311a by use of side surfaces of the light guiding member 381b, and thereby guides the light from the incident surface 393 to the outgoing surface 394. Note that, the areas of the incident surface 393 and the outgoing surface 394 are substantially equal to the area of a display region of the liquid crystal panel 351.

As described above, the light guiding member 381b is the prism having the side surfaces functioning as reflection surfaces, which superpose luminous fluxes of various incident angles being incident on the light guiding member 381b. Moreover, when used together with the tapered rod 381a, the light guiding member 381b can output the light having desired intensity distribution from the light guiding member 381b by changing the length of the light guiding member 381b.

Meanwhile, it is preferable that a ratio between a length $L_2$ of the light guiding member 381b in the direction of the optical axis b and a length $L_1$ of the tapered rod 381a in the direction of the optical axis b should be appropriately selected based on an area ratio between the incident surface 391 and the outgoing surface 392, the material of the light guiding member, directivity of the LED, and so forth.

Note that the lights described in the second embodiment of the present invention is lights finally reaches the screen, that is, utilized lights to be projected on the screen.

(Operations and Effects)

According to the optical device 300 (or a projection type video display 100) of the second embodiment of the present invention, the light reflected inside the light guiding members 381b, 382b and 383b is less dispersed by provision of the tapered rods 381a, 382a and 383a which have the prismatic and tapered shapes spreading increasingly from the blue LED 311a, the green LED 311b and the red LED 311c toward the light guiding members 381b, 382b and 383b, respectively. Moreover, the less dispersed light is polarized in a plane perpendicular to the optical axis, and thereby illuminates the peripheral portion more brightly than the optical axis portion where the optical axis passes through, in each of the liquid crystal panels 351 to 353 (in the plane parallel to the object plane of the projection lens 120 located in the vicinity of the object plane). Therefore, it is possible to easily equalize illuminance distribution of the image projected on the screen 200 (the projected image) without a projection lens of a large diameter. Moreover, it is possible to equalize the illuminance distribution of the image projected on the screen 200 easily without complicating the configuration of the projection lens 120.

Third Embodiment (Configuration of Optical Device)

Hereinafter, a configuration of an optical device according to a third embodiment of the present invention will be described with reference to the accompanying drawing. Note that, in the following, differences from the above-described second embodiment will be mainly described.

Specifically, the light emitted by the green LED 311b is irradiated on the liquid crystal panel 352 without being reflected by a mirror in the second embodiment, whereas the light emitted by the green LED 311b is reflected by a mirror and is then irradiated on the liquid crystal panel 352 in the third embodiment.

Figure 6:
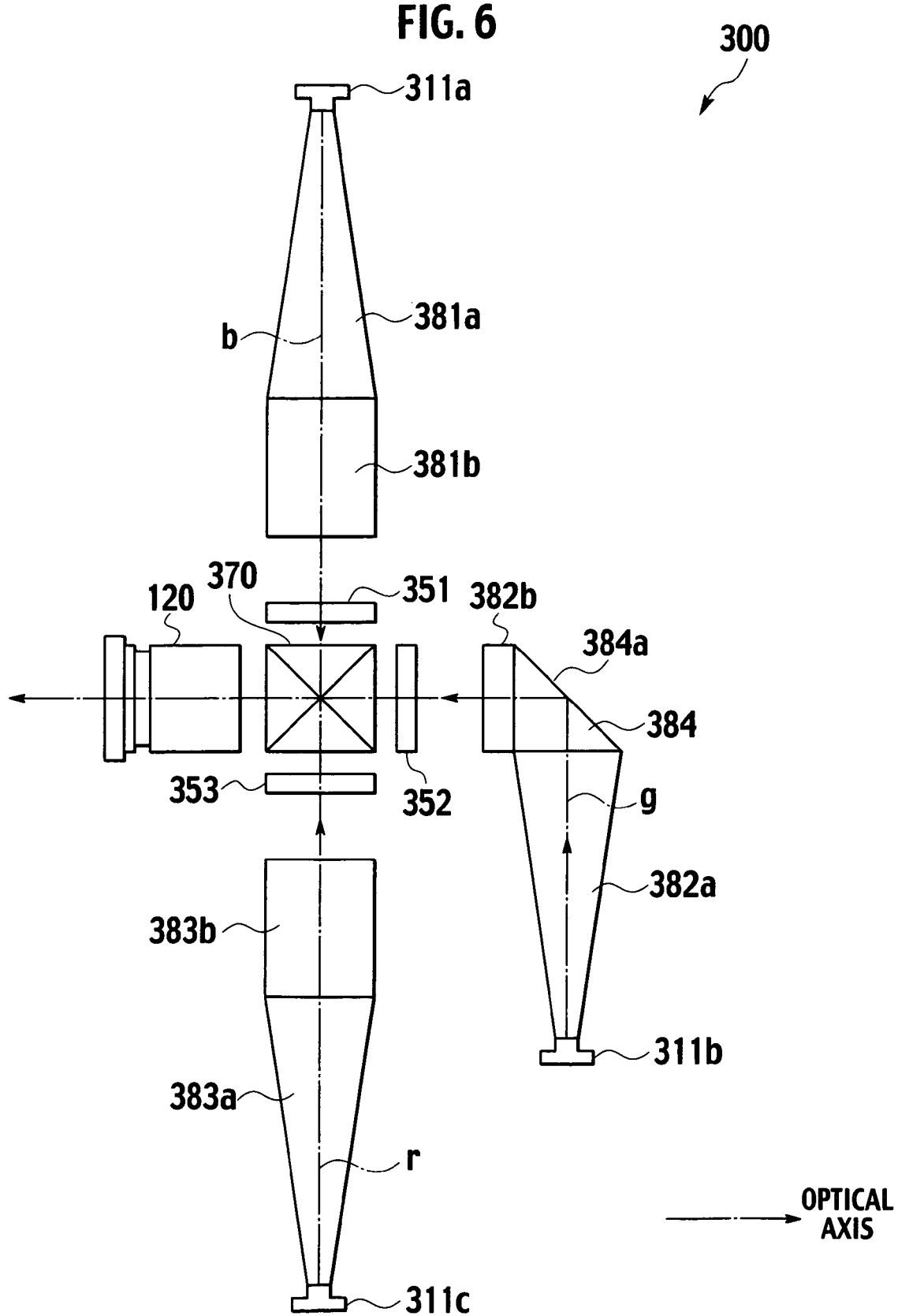
FIG. 6 is a view showing an optical device according to a third embodiment of the present invention.

FIG. 6 is a view showing an optical device 300 according to the third embodiment of the present invention. In FIG. 6, the same constituents as those described in FIG. 4 are denoted by the same reference numerals, and differences from FIG. 4 will be mainly described below.

As shown in FIG. 6, the optical device 300 includes a reflecting prism 384 provided with a reflecting mirror 384a. The reflecting prism 384 is fitted to the outgoing surface 392 of the tapered rod 382a and to the incident surface 393 of the light guiding member 382b, and the reflecting mirror 384a reflects the light emitted by the green LED 311b.

Note that, in the third embodiment, the reflecting prism 384 is fitted to the outgoing surface 392 of the tapered rod 382a. However, the present invention is not limited to this configuration. The reflecting prism 384 may also be disposed in the light guiding member 382b. In this case, the length of the light guiding member 382b may be reduced depending on an optical path length to be defined by the reflecting prism 384.

Moreover, it is preferable to provide air gaps between the reflecting prism 384 and the outgoing surface 392 of the tapered rod 382a, and between the reflecting prism 384 and the incident surface 393 of the light guiding member 382b.

(Operations and Effects)

According to the optical device 300 (or a projection type video display 100) of the third embodiment of the present invention, it is possible to reduce the length of the light guiding member 382b in the direction of the optical axis g by reflecting the light emitted from the green LED 311b by use of the reflecting mirror 384a. In this way, it is possible to arrange the each of the LEDs in a small space.

Moreover, as in the case of the second embodiment, it is possible to easily equalize illuminance distribution of the image projected on the screen 200 (the projected image) without using a projection lens of a large diameter or complicating the configuration of the projection lens 120.

(Fourth Embodiment)

(Configuration of Optical Device)

Hereinafter, a configuration of an optical device according to a fourth embodiment of the present invention will be described with reference to the accompanying drawing. Note that, in the following, differences from the above-described second embodiment will be mainly described.

Specifically, the light emitted by the green LED 311b is irradiated on the liquid crystal panel 352 without being reflected by a mirror in the second embodiment, whereas the light emitted by the green LED 311b is reflected by a mirror and is then irradiated on the liquid crystal panel 352 in the fourth embodiment.

Figure 7:
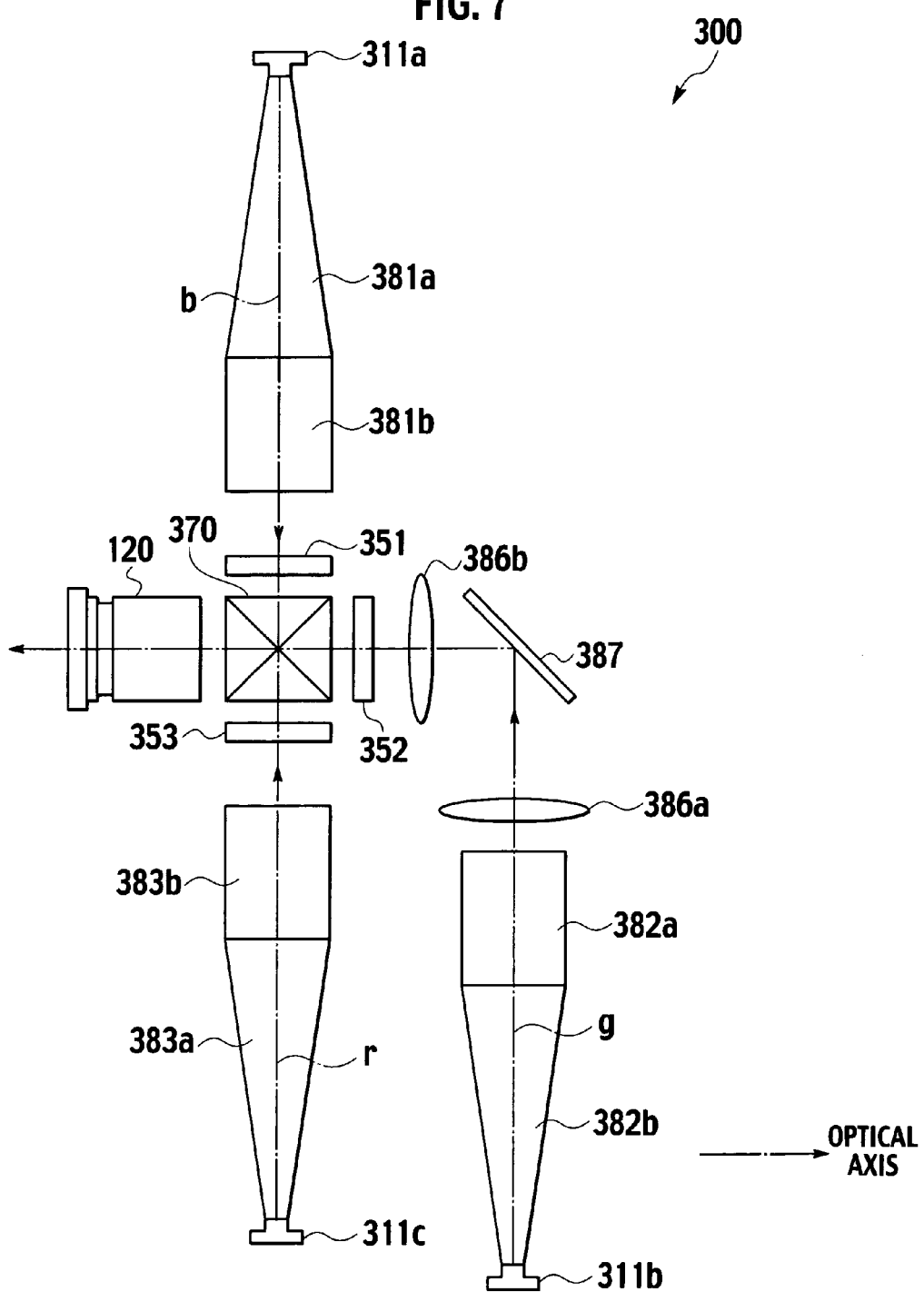
FIG. 7 is a view showing an optical device according to a fourth embodiment of the present invention.

FIG. 7 is a view showing an optical device 300 according to the fourth embodiment of the present invention. Note that, in FIG. 7, the same constituents as those described in FIG. 4 are denoted by the same reference numerals, and differences from FIG. 4 will be mainly described below.

As shown in FIG. 7, the optical device 300 includes a reflecting mirror 387, and relay lenses (relay lenses 386a and 386b). The relay lens 386a relays the light emitted by the green LED 311b to the reflecting mirror 387, and the reflecting mirror 387 reflects the light relayed by the relay lens 386a. Meanwhile, the relay lens 386b relays the light reflected by the reflecting mirror 387 to the liquid crystal panel 352.

(Operations and Effects)

According to the optical device 300 (or a projection type video display 100) of the fourth embodiment of the present invention, it is possible to reduce the length of the light guiding member 382b in the direction of the optical axis g by reflecting the light emitted from the green LED 311b by use of the reflecting mirror 387. In addition, it is possible to arrange each of the LEDs in a small space and to thereby enhance the layout freedom for the LEDs.

Moreover, as in the case of the second embodiment, it is possible to easily equalize illuminance distribution of the image projected on the screen 200 (the projected image) without using a projection lens of a large diameter or complicating the configuration of the projection lens 120.

Fifth Embodiment (Configuration of Optical Device)

Hereinafter, a configuration of an optical device according to a fifth embodiment of the present invention will be described with reference to the accompanying drawing. Note that, in the following, differences from the above-described second embodiment will be mainly described.

Specifically, the blue LED 311*a*, the green LED 311*b* and the red LED 311*c* are provided as the light sources in the second embodiment. Instead, a discharge lamp is provided as a light source in the fifth embodiment.

Moreover, each of the LEDs is provided with the tapered rod in the second embodiment, whereas a single tapered rod is provided so as to correspond to the discharge lamp in the fifth embodiment.

Figure 8:
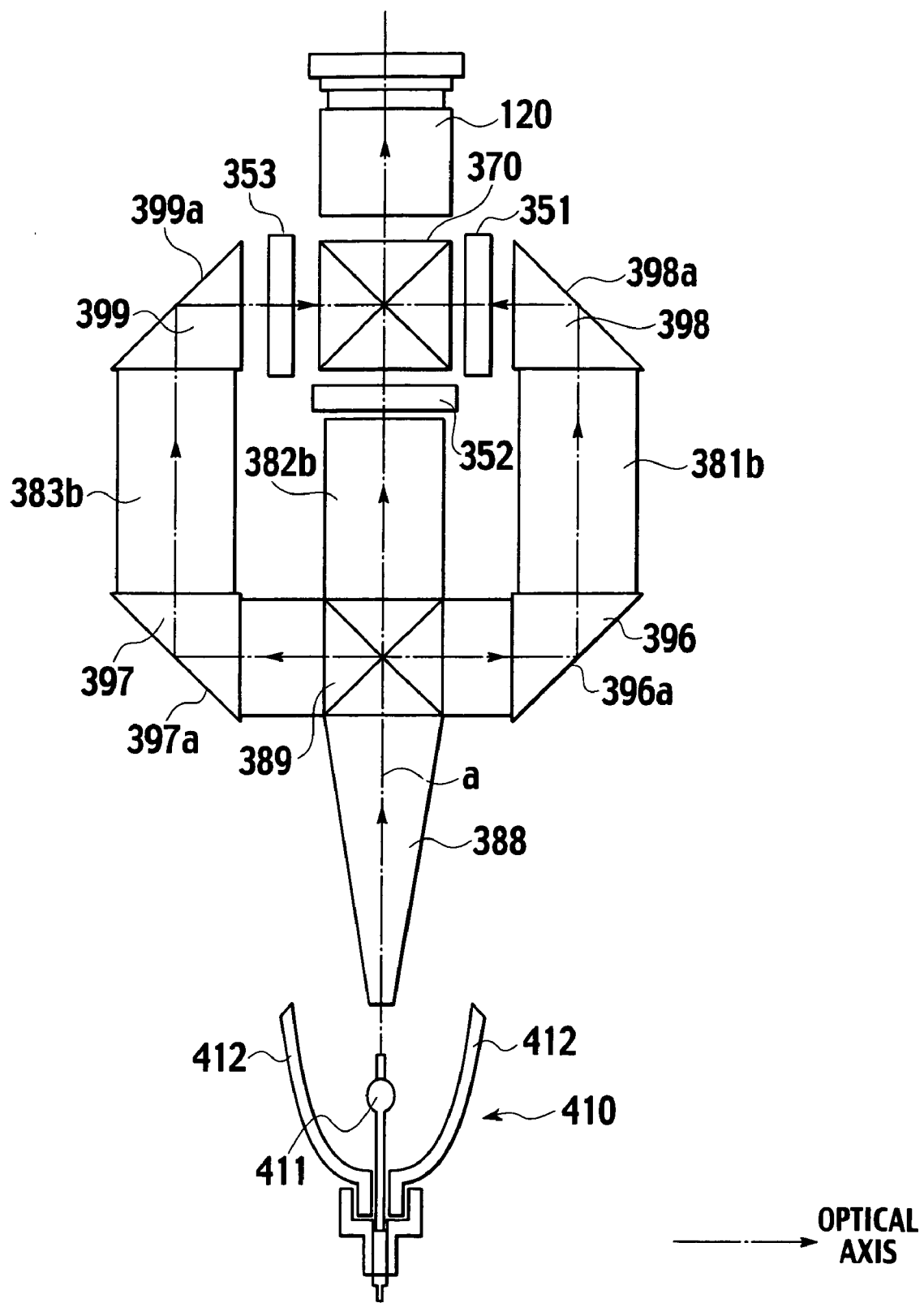
FIG. 8 is a view showing an optical device according to a fifth embodiment of the present invention.

FIG. 8 is a view showing an optical device 300 according to the fifth embodiment of the present invention. Note that, in FIG. 8, the same constituents as those described in FIG. 4 are denoted by the same reference numerals, and differences from FIG. 4 will be mainly described below.

As shown in FIG. 8, the optical device 300 includes a light source 410 provided with a discharge lamp 411 and a reflector 412, a common tapered rod 388 having a prismatic and tapered shape spreading increasingly in the direction of the optical axis a, a color separation prism 389 configured to separate the light emitted by the light source 410 (the discharge lamp 411) into light components having wavelengths corresponding to the respective colors (blue, green and red), and reflecting prisms 396 to 399.

Here, an optical path length of passage of the light having the wavelength corresponding to green (that is, the length of the light guiding member 382*b* in the direction of the optical axis) is shorter than optical path lengths of the light having the wavelengths corresponding to blue and red (that is, the lengths of the light guiding members 381*b* and 383*b* in the direction of the optical axes). Therefore, the light guiding member 382*b* is made of a medium having a different refractive index from those of the light guiding members 381*b* and 383*b*.

(Operations and Effects)

According to the optical device 300 (or a projection type video display 100) of the fifth embodiment of the present invention, it is possible to save a space by providing the common tapered rod 388 instead of the plurality of tapered rods (the tapered rods 381*a* to 383*a*). Moreover, it is possible to use a white light source as the light source 410, which is excellent in luminance and versatility.

In addition, as in the case of the second embodiment, it is possible to easily equalize illuminance distribution of the image projected on the screen 200 (the projected image) without using a projection lens of a large diameter or complicating the configuration of the projection lens 120.

(Evaluation Results)

Figure 9:
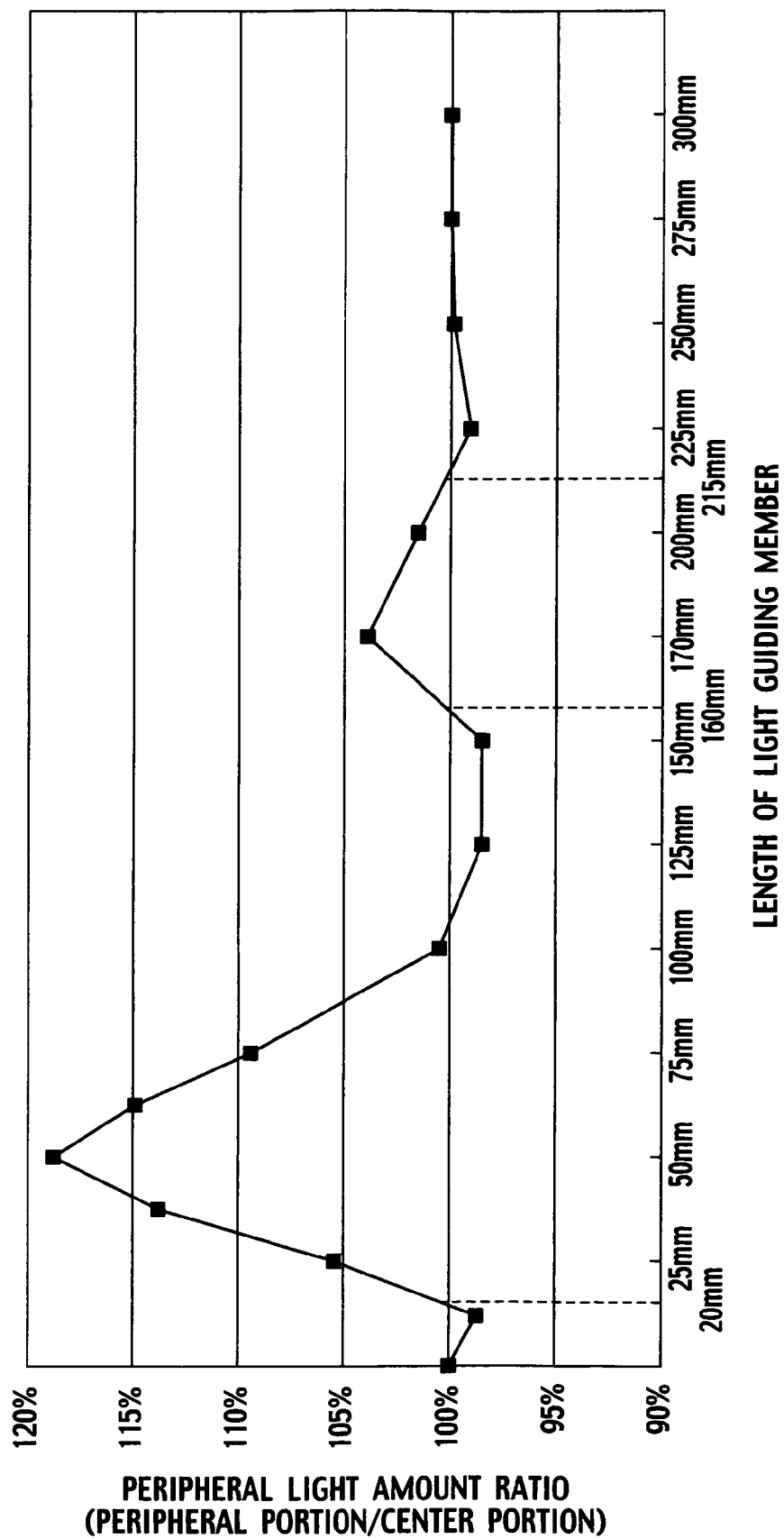
FIG. 9 is a graph showing an evaluation result of the second embodiment of the present invention.

Hereinafter, evaluation results of the second to fifth embodiments of the present invention will be described with reference to the accompanying drawings. FIG. 9 is a graph showing an evaluation result of the second embodiment of the present invention. In FIG. 9, the longitudinal axis indicates a ratio between a light amount in the optical axis portion where the optical axis passes through and a light amount in the peripheral portion located in the periphery of the axis portion, in the object plane of the projection lens 120 (a peripheral light amount ratio), and the lateral axis indicates the length $L_2$ of the light guiding member. Note that this evaluation only deals with the light which is effectively captured into the projection lens 120 depending on a focal length and an effective diameter of the projection lens 120 (depending on the F number).

Moreover, in this evaluation, the length $L_1$ of each of the tapered rods (the tapered rods 381*a* to 393*a*) is set equal to 100 mm, and an area ratio between the incident surface 391 and the outgoing surface 392 is set equal to 15.5. Meanwhile, the material of the light guiding members (the light guiding members 381*b* to 383*b*) is BK7, and the respective LEDs (the blue LED 311*a*, the green LED 311*b* and the red LED 311*c*) have directivity superior to Lambertian (for example, a half-value width of 52°).

As shown in FIG. 9, in this evaluation, the peripheral light amount ratio exceeds 100% (in other words, the peripheral portion becomes more brightly than the optical axis portion) when the length $L_2$ of the light guiding member is in a range of 20 mm to 100 mm. Moreover, the peripheral light amount ratio exceeds 100% when the length $L_2$ of the light guiding member is in a range of 160 mm to 215 mm.

Accordingly, it is possible to counterbalance the falloff of a light amount in the peripheral portion of the projection lens 120 by setting the length $L_2$ of the guiding member either within the range of 20 mm to 100 mm or within the range of 160 mm to 215 mm. In this way, it is possible to equalize illuminance distribution of the image projected on the screen 200 (the projected image).

Here, it is needless to say that the optimum range for the length $L_2$ of the light guiding member varies depending on the length $L_1$ of the tapered rod, the area ratio between the incident surface 391 and the outgoing surface 392, the material of the light guiding member, directivity of the LED, and so forth.

(Mechanism of Peripheral Light Amount Ratio Exceeding 100%)

Hereinafter, a mechanism how the peripheral light amount ratio exceeds 100% depending on the length of the light guiding member will be schematically described with reference to the accompanying drawings. FIG. 10 to FIG. 13 are diagrams for explaining the mechanism how the peripheral light amount ratio exceeds 100% depending on the length of the light guiding member.

Figure 10:
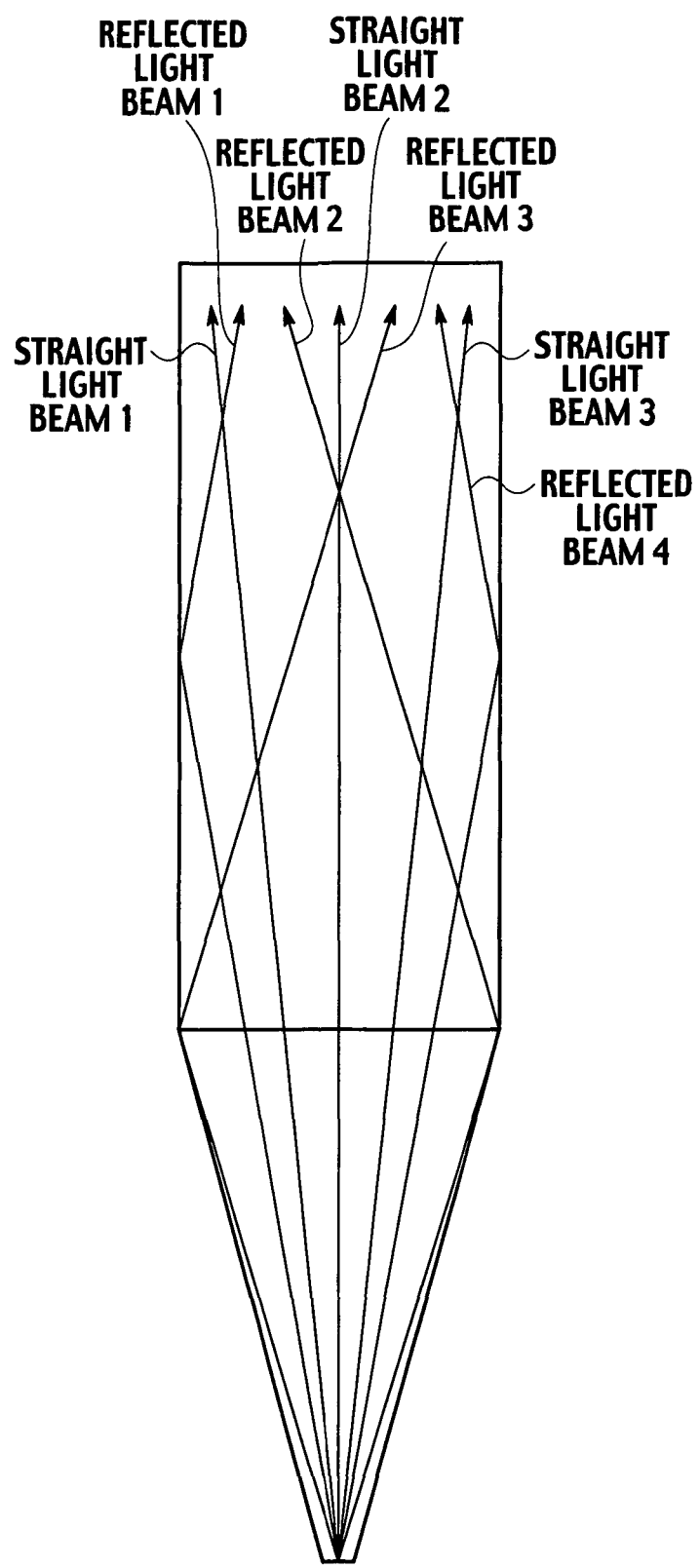
FIG. 10 is a first diagram for explaining a mechanism how a peripheral light amount ratio exceeds 100% depending on a length of a light guiding member.

First, the light to be guided into the light guiding member will be described with reference to FIG. 10 and FIG. 11 without considering the reflective light which is reflected inside the tapered rod. As shown in FIG. 10, the light guided into the light guiding member includes straight light (straight light beams 1 to 3, and so forth) which is not reflected inside the light guiding member, and reflected light (reflected light beams 1 to 4, and so forth) which is reflected inside the light guiding member.

Figure 11:
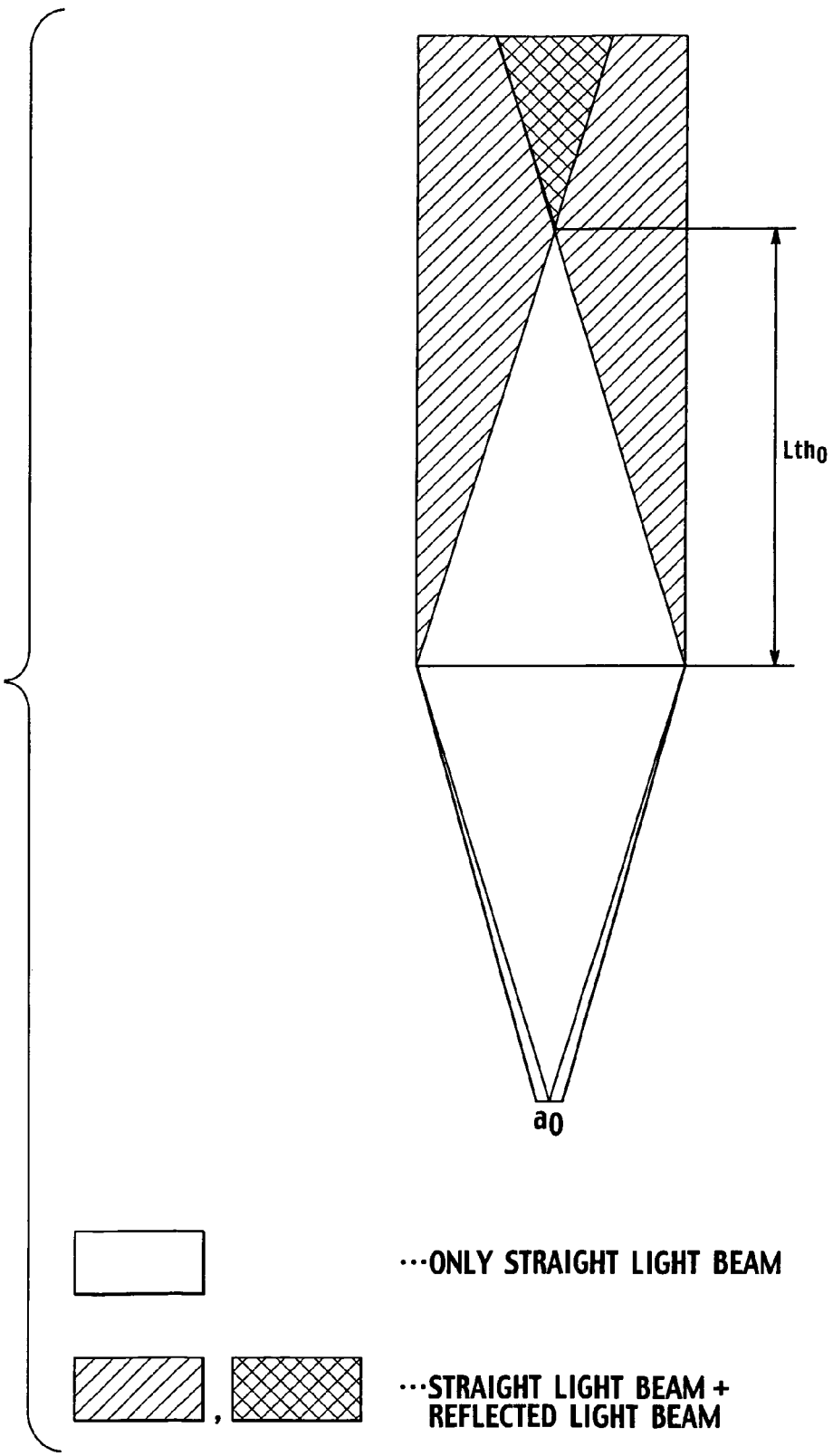
FIG. 11 is a second diagram for explaining the mechanism how the peripheral light amount ratio exceeds 100% depending on the length of the light guiding member.

Subsequently, as shown in FIG. 11, inside the light guiding member there are a region occupied solely by the straight light beams (a blank portion), and a region where the straight light beams and the reflected light beams are superposed (shaded portions and a meshed portion). Moreover, the light amount in the region where the straight light beams and the reflected light beams are superposed (the shaded portions and the meshed portion) is greater than the light amount in the region occupied solely by the straight light beams (the blank portion).

Therefore, when the reflected light to be reflected in the tapered rod is not taken into account, the peripheral light amount ratio (the peripheral portion/the central portion) exceeds 100% if the length of the light guiding member is equal to or below a threshold $L_{th0}$. Here, when the reflected light to be reflected in the tapered rod is not taken into account, the threshold $L_{th0}$ is equivalent to a length between the incident surface of the light guiding member and an intersection of the reflected light beams which are reflected by the outer edges of the incident surface.

Figure 12:
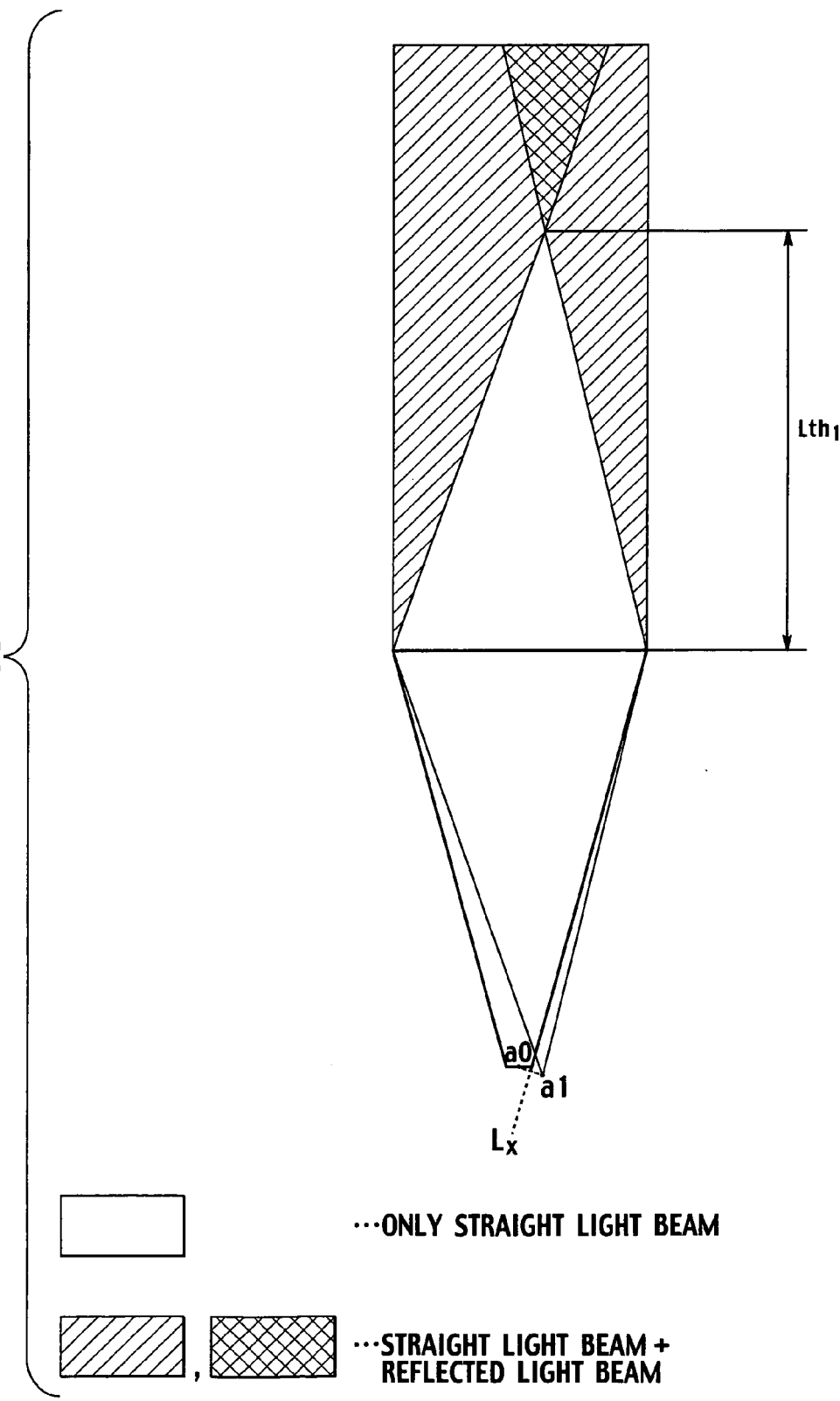
FIG. 12 is a third diagram for explaining the mechanism how the peripheral light amount ratio exceeds 100% depending on the length of the light guiding member.
Figure 13:
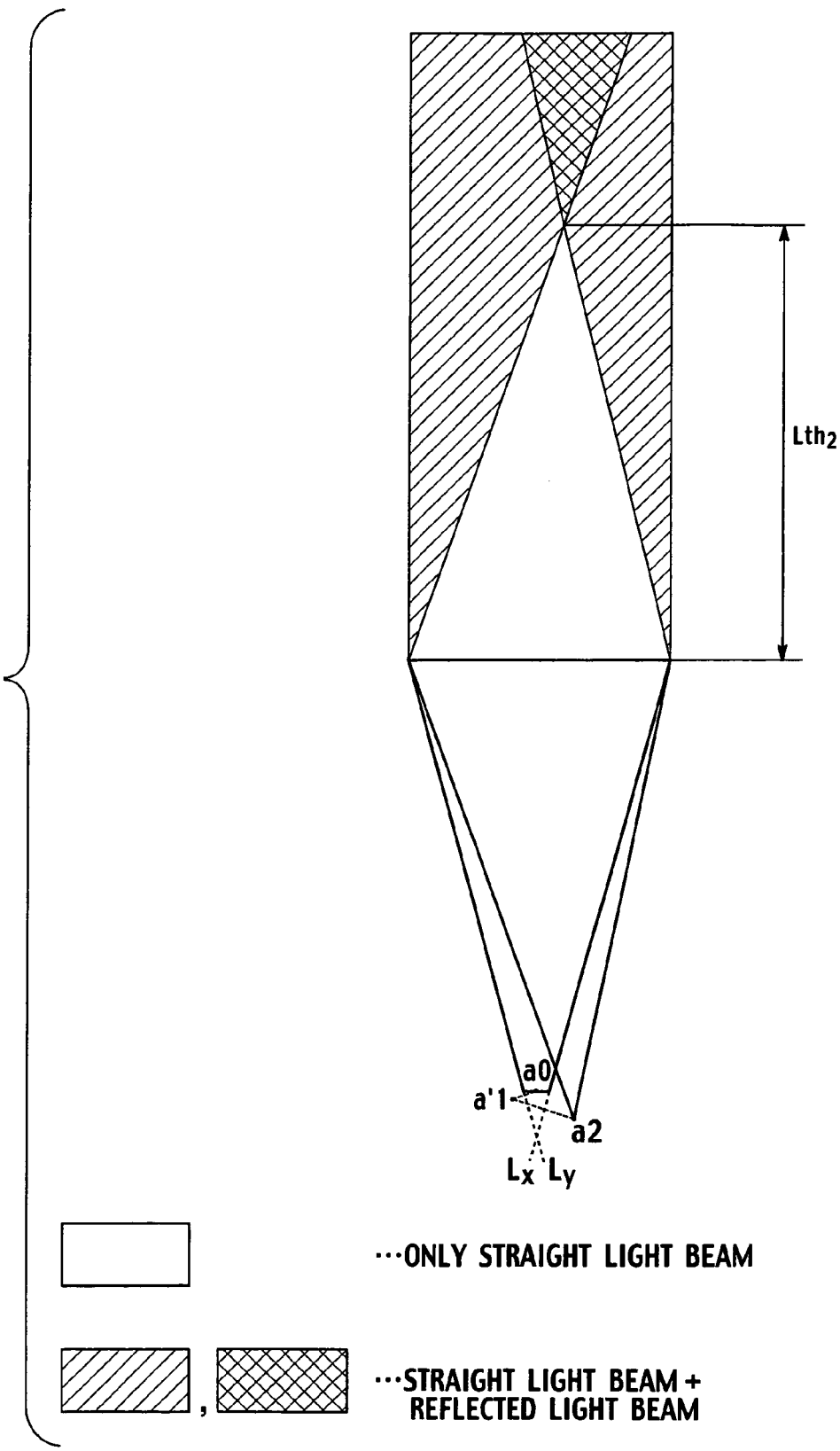
FIG. 13 is a fourth diagram for explaining the mechanism how the peripheral light amount ratio exceeds 100% depending on the length of the light guiding member.

It should be noted that only the light passing through a light spot $a_0$ is considered in FIG. 11 to FIG. 13. Moreover, it should also be noted that FIG. 11 to FIG. 13 illustrate only the lines representing the light beams, which have the largest angles to the optical axis, among the light beams which pass through the light spot $a_0$.

Next, the light to be guided into the light guiding member will be described with reference FIG. 12 and FIG. 13 while focusing only on the reflected light which is reflected in the tapered rod. FIG. 12 and FIG. 13 are illustrated in accordance with the law of light reflection found by Euclid that the light reflected by a reflection surface is reflected at an outgoing angle which is equal to an incident angle. Moreover, for the purpose of simplification of the explanation, only the light beams passing through the center of the incident surface (the light spot $a_0$ to be described later) of the tapered rod are considered herein.

As shown in FIG. 12, a reflected light beam which passes through the light spot $a_0$ and which is reflected just once in the tapered rod (a reflected light beam reflected by a side surface Lx) is deemed as a straight light beam outgoing from a position (a light spot $a_1$) axisymmetric to the light spot $a_0$ with respect to an extended line of the side surface (Lx) of the tapered rod.

When focusing on the reflected light beams reflected just once in the tapered rod, there are the region occupied solely by the straight light beams (the blank portion) and the region where the straight light beams and the reflected light beams are superposed (the shaded portions and the meshed portion) inside the light guiding member as in the case of the above-described FIG. 11.

Therefore, when focusing only on the reflected light beams reflected just once in the tapered rod, the peripheral light amount ratio (the peripheral portion/the central portion) exceeds 100% if the length of the light guiding member is equal to or below a threshold $L_{th1}$. Here, when considering only the reflected light beams to be reflected only once in the tapered rod, the threshold $L_{th1}$ is equivalent to a length between the incident surface of the light guiding member and an intersection of the reflected light beams which are reflected by the outer edges of the incident surface.

Similarly, as shown in FIG. 13, a reflected light beam which passes through the light spot $a_0$ and which is reflected just once in the tapered rod (a reflected light beam reflected by a side surface Ly) is deemed as a straight light beam outgoing from a position (a light spot $a'_1$) axisymmetric to the light spot $a_0$ with respect to an extended line of the side surface (Ly) of the tapered rod. Moreover, a reflected light beam which passes through the light spot $a_0$ and which is reflected just twice in the tapered rod (a reflected light beam reflected by the side surface Lx and by the side surface Ly) is deemed as a straight light beam outgoing from a position (a light spot $a_2$) axisymmetric to the light spot $a'_1$ with respect to the extended line of the side surface (Lx) of the tapered rod.

When focusing only on the reflected light beams reflected just twice in the tapered rod, there are the region occupied solely by the straight light beams (the blank portion) and the region where the straight light beams and the reflected light beams are superposed (the shaded portions and the meshed portion) inside the light guiding member as in the case of the above described FIG. 11.

Therefore, when focusing only on the reflected light beams reflected just twice in the tapered rod, the peripheral light amount ratio (the peripheral portion/the central portion) exceeds 100% if the length of the light guiding member is equal to or below a threshold $L_{th2}$. Here, when considering only the reflected light beams to be reflected only twice in the tapered rod, the threshold $L_{th2}$ is equivalent to a length between the incident surface of the light guiding member and an intersection of the reflected light beams that are reflected by the outer edges of the incident surface.

Although the reflected light beams, which are reflected just once or twice by one of the side surfaces, are considered in FIG. 12 and FIG. 13, reflected light beams to be reflected just once or twice by another side surface exhibit the same aspects.

When considering all the light beams either not reflected or reflected just once or twice in the tapered rod, all the light beams illustrated in FIG. 11 to FIG. 13 are superposed inside the light guiding member. In this case, if the length of the light guiding member is equal to or below certain thresholds ($Lth_0$ to $Lth_2$) as shown in FIG. 11 to FIG. 13, then the peripheral light amount ratio (the peripheral portion/the central portion) exceeds 100%.

Specifically, when considering all the light beams to be reflected 0 through 2 times in the tapered rod, the peripheral light amount ratio (the peripheral portion/the central portion) is estimated to exceed 100%, if the length of the light guiding member (the length between the incident surface and the outgoing surface) is shorter than the shortest length of all kinds of the lengths between the incident surface of the light guiding member and the intersections of the reflected light beams reflected by the outer edges of the incident surface. That is the peripheral light amount ratio (the peripheral portion/the central portion) is estimated to exceed 100%, if a length of the light guiding member is shorter than a length of the tapered rod.

(Difference in Peripheral Light Amount Ratio Corresponding to Wavelength (Color))

Figure 14:
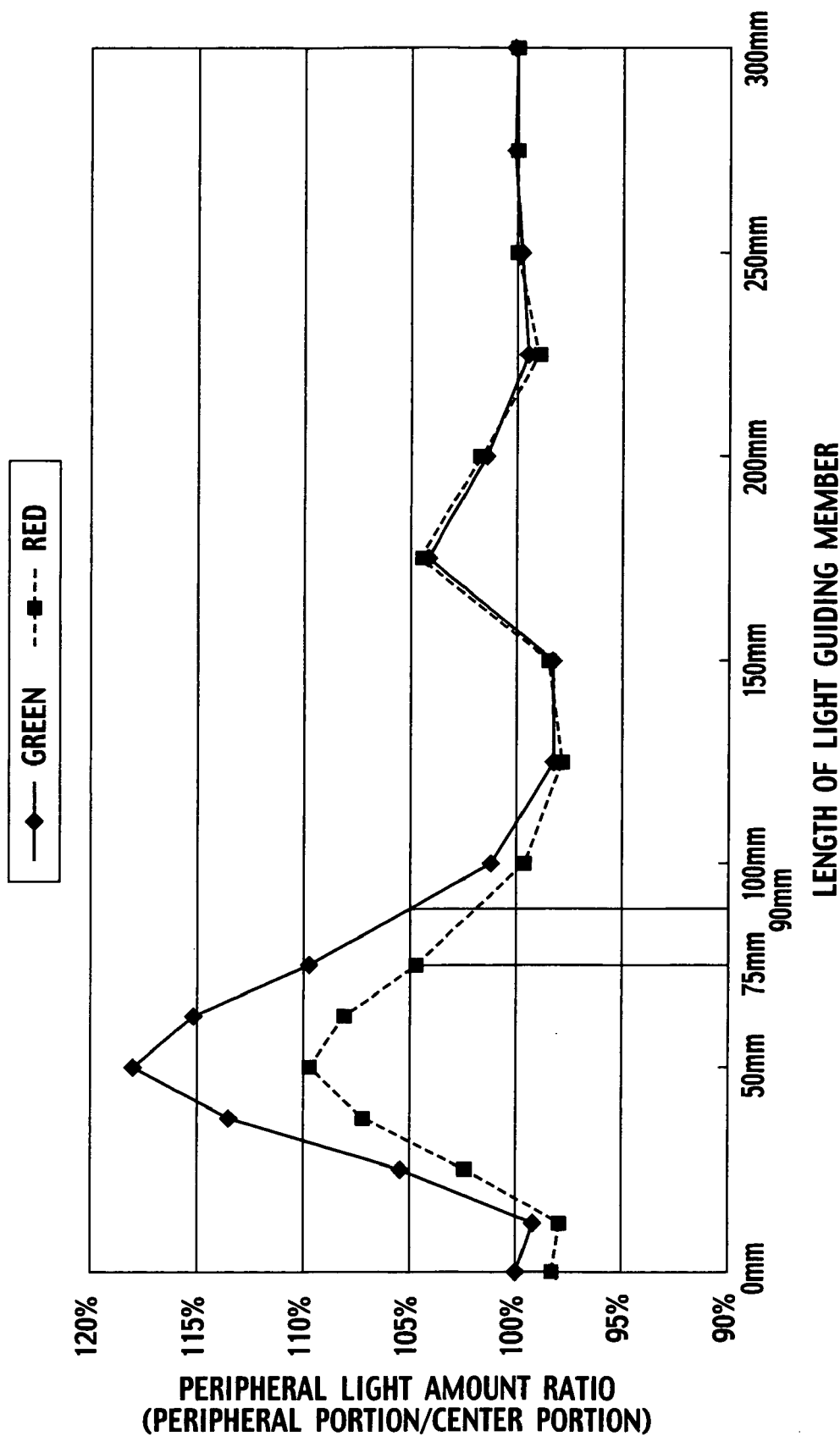
FIG. 14 is a graph for explaining a difference in the peripheral light amount ratio corresponding to a wavelength (a color).

Hereinafter, a difference in the peripheral light amount ratio corresponding to the wavelength (the color) will be described with reference to the accompanying drawing. FIG. 14 is a graph for explaining the difference in the peripheral light amount ratio corresponding to the wavelength (the color). Note that the cases of green and red will be described as examples in FIG. 14.

As shown in FIG. 14, the peripheral light amount ratios corresponding to the lengths of the light guiding member differ between the green light and the red light. Specifically, even when the length of the light guiding member remains the same (such as 50 mm), the peripheral light amount ratio (such as 118%) in the case of the green light is different from the peripheral light amount ratio (such as 109%) in the case of the red light. Here, the differences in the peripheral light amount ratios among the respective colors are attributed to differences in directivity distribution and the wavelengths of the light sources for the respective colors, and the like.

Here, color heterogeneity occurs when the peripheral light amount ratios are different among the respective colors. Accordingly, it is preferable to adjust the peripheral light amount ratios of the respective colors to the same value.

Therefore, the peripheral light amount ratios of the respective colors are adjusted to the same value by changing the lengths of the light guiding members corresponding to the respective colors. For example, the peripheral light amount ratios of the respective colors are adjusted to 105% by setting the length of the light guiding member corresponding to the green light equal to 90 mm, and concurrently setting the length of the light guiding member corresponding to the red light equal to 75 mm.

In this way, when the characteristics of the peripheral light amount ratios vary depending on the wavelengths, it is possible to adjust the peripheral light amount ratios of the respective colors to the same value by changing the lengths of the light guiding members corresponding to the respective colors.

Other Embodiments

In the above-described first to fifth embodiments, the optical device 300 is described as being a three-plate-valve system. However, the present invention is not limited to this configuration. The optical device 300 may be a one-plate-valve system. Moreover, in the above-described first to fifth embodiments, the projection type video display 100 uses the liquid crystal panels as the light valves. However, the present invention is not limited to this configuration. A display apparatus may be of a DLP (Digital Light Processing; registered trade mark) type using a digital micromirror device (DMD) as a light valve.

In the above-described second to fifth embodiments, the tapered rods (the tapered rods 381a to 383a, and the common tapered rod 388) and the light guiding members (the light guiding members 381b to 383b) are solid members having the tapered or prismatic shapes. However, the present invention is not limited to these configurations. Any of these constituents may be a hollow member having an angled hollow shape and including mirrors disposed on inner walls thereof.

Moreover, although cross sections (cross sections perpendicular to the optical axis) of the tapered rods and the light guiding members are quadrangular in these embodiments, the present invention is not limited to these configurations. The tapered rods or the light guiding members may also have circular or other polygonal cross sections.

In the above-described fifth embodiment, the discharge lamp 411 is provided as the light source. However, the present invention is not limited to this configuration. A white LED may be provided as the light source.

What is claimed is:
1. An optical device comprising:
a light source;
a light valve;
a projection lens configured to enlarge an image to be displayed on the light valve, wherein,
the light valve is disposed in the vicinity of an object plane of the projection lens; and
an illumination uniformity redistributor that illuminates a peripheral portion more brightly than an optical axis portion, in a plane parallel to the object plane located in the vicinity of the object plane of the projection lens, said illumination uniformity redistributor including:
a tapered rod disposed between said light valve and said light source and having a shape extending along the optical axis; and
a light guiding member disposed between said light valve and said tapered rod and having a shape extending along the optical axis,
the tapered rod has a shape spreading increasingly from the light source toward the light guiding member, and
the light guiding member reflects the light passing through the tapered rod by use of side surfaces of the light guiding member, and guides the light to the light valve, and wherein
a ratio between the length of the light guiding member in the direction of the optical axis and the length of the tapered rod in the direction of the optical axis is set in accordance with directivity of said light source such that the peripheral portion is illuminated more brighter than the optical axis portion;
the optical axis portion is a portion of said parallel plane where an optical axis passes through,
the peripheral portion is a portion of said parallel plane located in the periphery of the optical axis portion.
2. The optical device according to claim 1 wherein the light guiding member is made of a transparent medium.
3. The optical device according to claim 1 wherein the light guiding member has a hollow shape where an inner wall of the light guiding member is configured of a mirror.
4. The optical device according to claim 1 wherein a length of the light guiding member is shorter than a length of the tapered rod.
5. A projection video display comprising the optical device according to any one of claims 1 and 2 to 4.

* * * * *